United States Patent
Schneider et al.

(10) Patent No.: US 7,516,682 B2
(45) Date of Patent: Apr. 14, 2009

(54) CLAMP FOR FRICTION LOCK MECHANISM ON STEERING COLUMN

(75) Inventors: Douglas M. Schneider, Saginaw, MI (US); Kurt J. Hilbrandt, Hemlock, MI (US); Sam L. Scrivener, Durand, MI (US); Thomas W. Spendlove, Birch Run, MI (US)

(73) Assignee: Delphi Technologies, Inc., Troy, MI (US)

( * ) Notice: Subject to any disclaimer, the term of this patent is extended or adjusted under 35 U.S.C. 154(b) by 658 days.

(21) Appl. No.: 11/138,191

(22) Filed: May 26, 2005

(65) Prior Publication Data

US 2006/0266150 A1 Nov. 30, 2006

(51) Int. Cl.
 *B62D 1/18* (2006.01)
(52) U.S. Cl. .................................. 74/493; 280/775
(58) Field of Classification Search .................. 74/493; 280/775
 See application file for complete search history.

(56) References Cited

U.S. PATENT DOCUMENTS

| 6,036,228 A | 3/2000 | Olgren et al. |
| 2002/0024208 A1 | 2/2002 | Fujiu et al. |
| 2005/0217407 A1* | 10/2005 | Yamamura .................. 74/492 |

FOREIGN PATENT DOCUMENTS

| DE | 10 94 121 | 12/1960 |
| EP | 1 125 820 | 8/2001 |

OTHER PUBLICATIONS

European Search Report dated Oct. 4, 2006.

* cited by examiner

*Primary Examiner*—William C Joyce
(74) *Attorney, Agent, or Firm*—Thomas N. Twome

(57) ABSTRACT

The invention provides a steering column assembly having a steering column jacket operable to support a steering shaft. The steering column assembly also includes a collar presenting a surface for guiding movement of the steering column jacket. The steering column assembly also includes a locking member operable to move in a first direction from an unlocked position to a locked position to increasingly urge the steering column jacket and the surface of the collar together to lock relative movement between the steering column jacket and the collar. The steering column assembly also includes a shaft operable to rotate in a first angular direction about a first axis to move the locking member in the first direction. The steering column assembly also includes a crank extending radially outwardly from the shaft. The steering column assembly also includes a lever operable to rotate in a second angular direction about a second axis spaced from the first axis. The steering column assembly also includes a link pivotally interconnecting the crank and the lever to transmit rotation of the lever to rotate the crank thereby rotating the shaft.

9 Claims, 4 Drawing Sheets

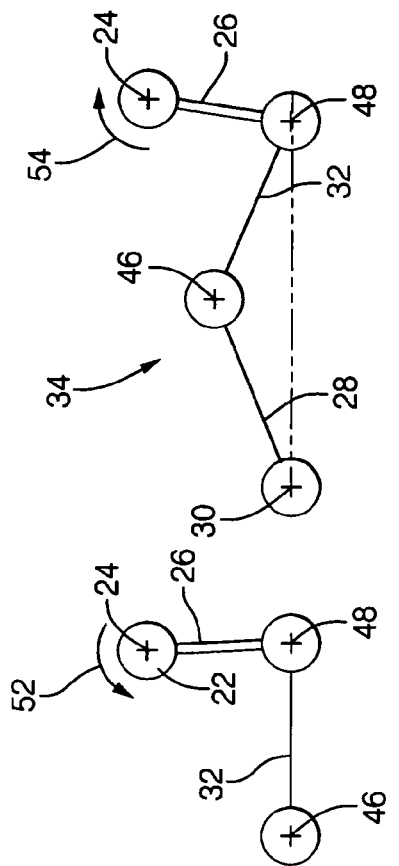
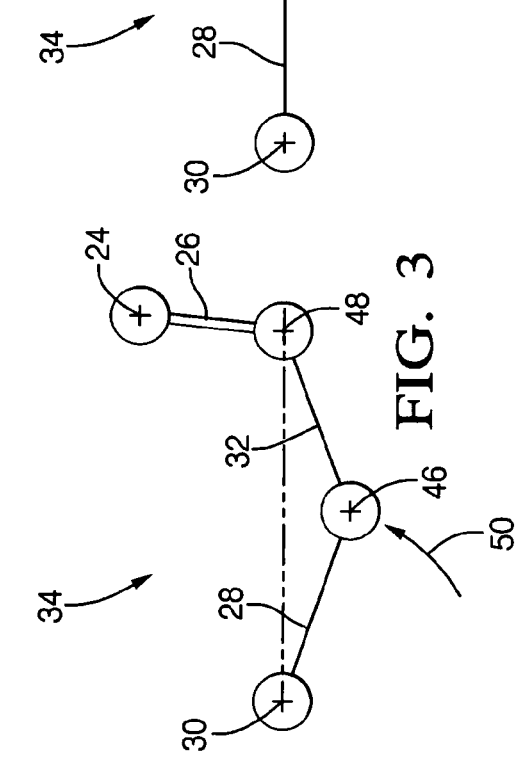
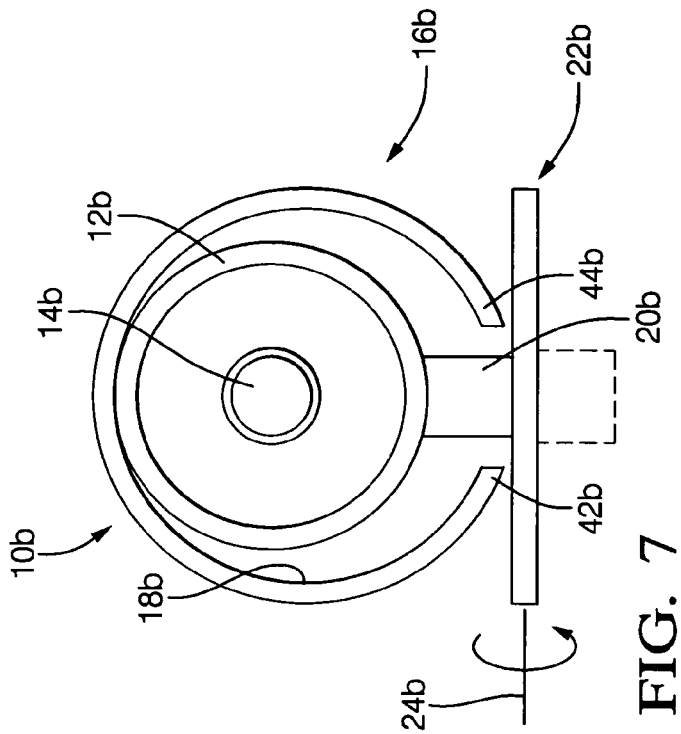
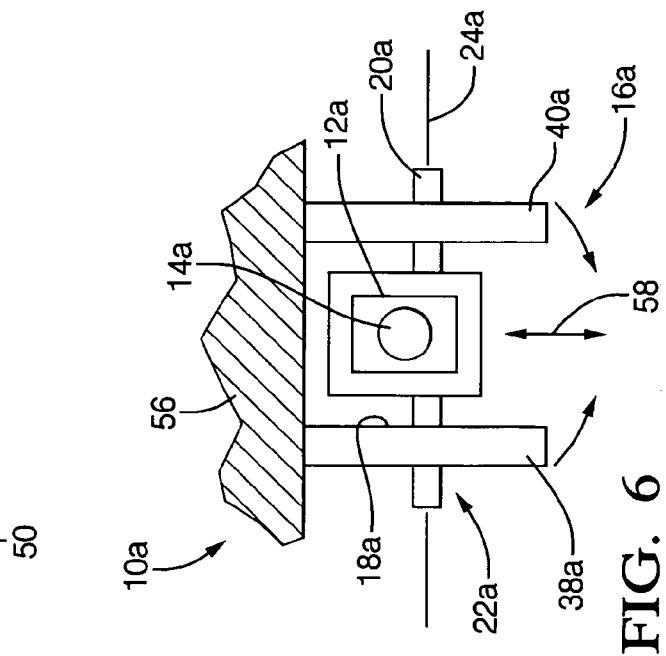

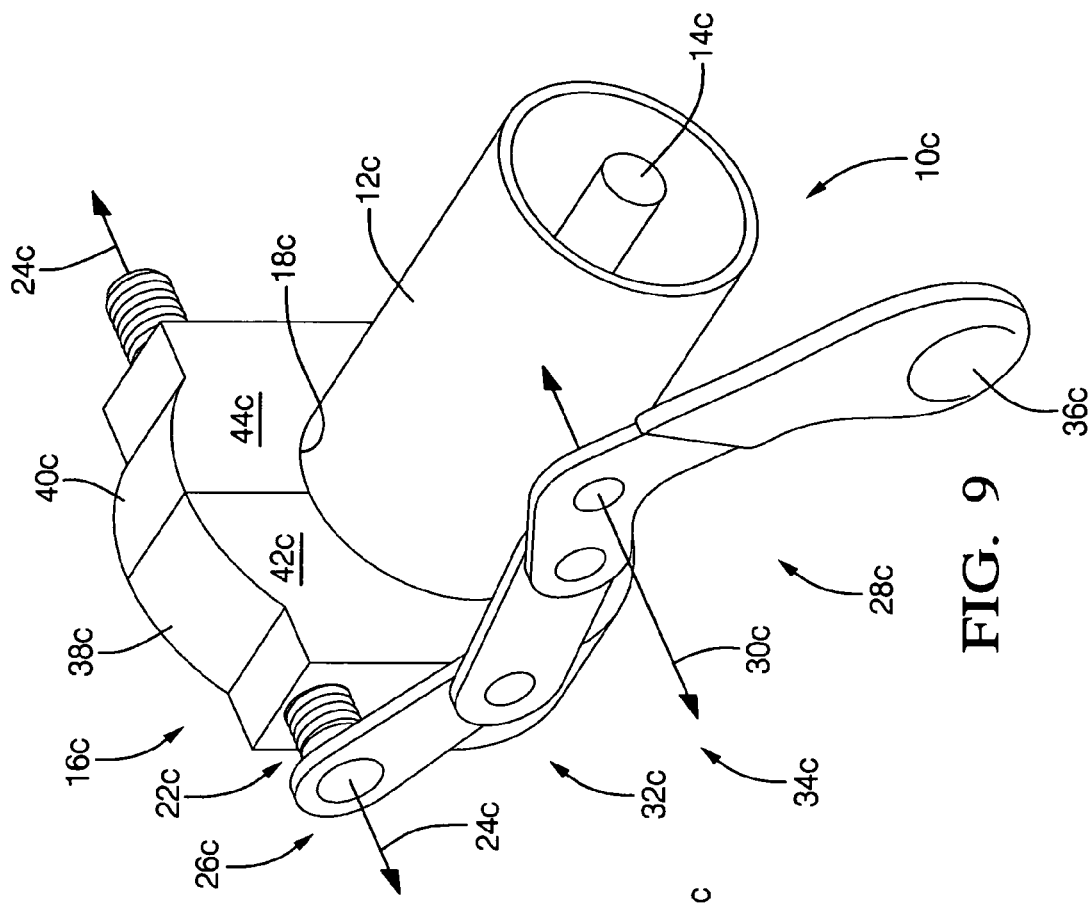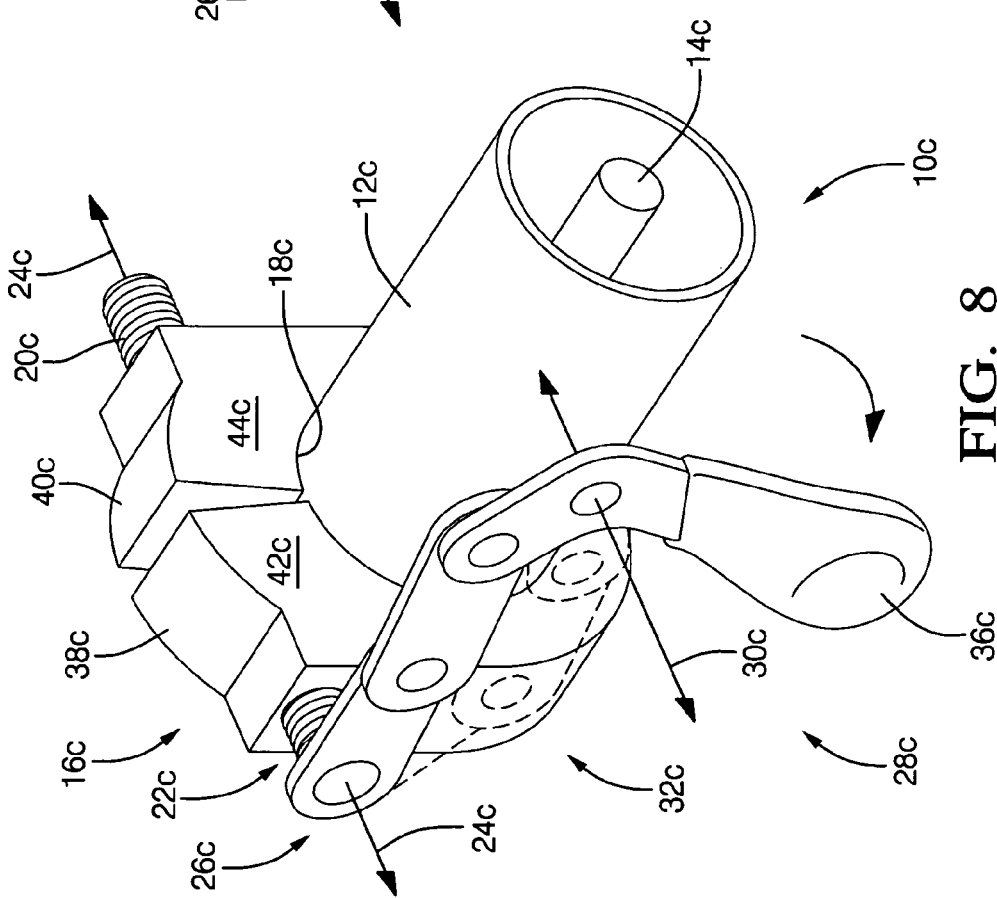

CLAMP FOR FRICTION LOCK MECHANISM ON STEERING COLUMN

FIELD OF THE INVENTION

The invention relates to an adjustable steering column and more particularly to a friction lock for locking the steering column.

BACKGROUND OF THE INVENTION

Steering columns are disposed in vehicles to support the steering wheel for use by the driver. Steering columns can be adjustable to change the position of the steering wheel to enhance the comfort of the driver. Raking movement and tilting movement change the angular position of the steering wheel. Telescoping movement changes the position of the steering wheel along the center axis of the steering column relative to the dashboard, the steering wheel moving outward or inward from the dashboard. Adjustable steering columns include locks to prevent movement of the steering wheel after the desired position of the steering wheel has been established.

SUMMARY OF THE INVENTION AND ADVANTAGES

The invention provides a steering column assembly having a steering column jacket operable to support a steering shaft in a vehicle. The steering column assembly also includes a collar presenting a surface for guiding movement of the steering column jacket. The steering column assembly also includes a locking member operable to move in a first direction from an unlocked position to a locked position to increasingly urge the steering column jacket and the surface of the collar together to lock relative movement between the steering column jacket and the collar. The steering column assembly also includes a shaft operable to rotate in a first angular direction about a first axis to move the locking member in the first direction. The steering column assembly also includes a crank extending radially outwardly from the shaft. The steering column assembly also includes a lever operable to rotate in a second angular direction about a second axis spaced from the first axis. The steering column assembly also includes a link pivotally interconnecting the crank and the lever to transmit rotation of the lever to rotate the crank thereby rotating the shaft.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a first schematic diagraph showing the axis' of the pivoting movement during movement of a locking member from an unlocked position to a locked position;

FIG. 4 is a second schematic diagraph showing the axis' of the pivoting movement during movement of a locking member from an unlocked position to a locked position;

FIG. 5 is a third schematic diagraph showing the axis' of the pivoting movement during movement of a locking member from an unlocked position to a locked position;

FIG. 6 is a schematic view of a second exemplary embodiment of the invention;

FIG. 7 is a schematic view of a third exemplary embodiment of the invention;

FIG. 8 is a perspective view of a fourth exemplary of the invention in an unlocked configuration; and FIG. 9 is a perspective view of the fourth exemplary of the invention in a locked configuration.

DETAILED DESCRIPTION OF THE PREFERRED EMBODIMENT

Figure 1:
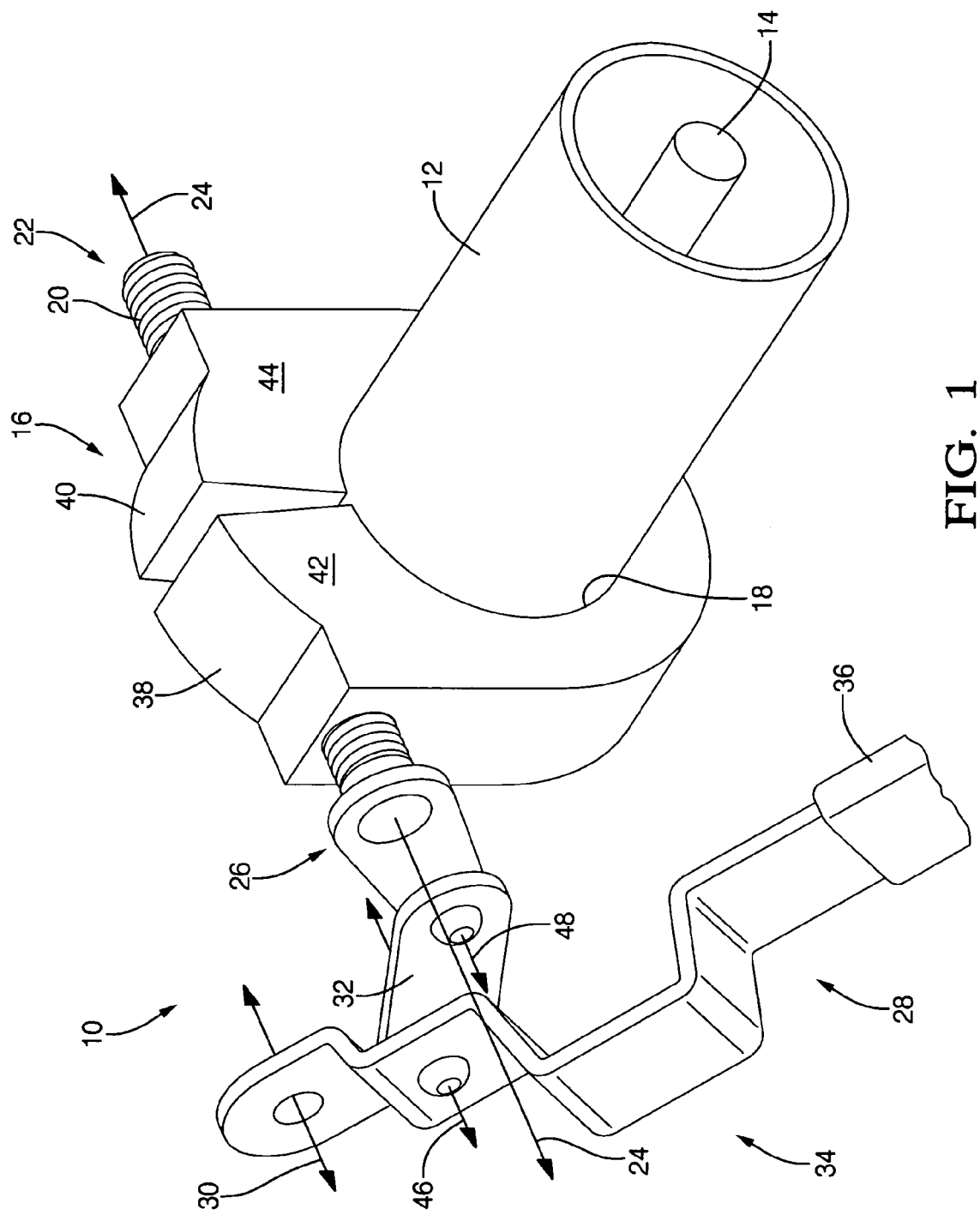
FIG. 1 is a perspective view of a first exemplary of the invention in an unlocked configuration.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Figure 2:
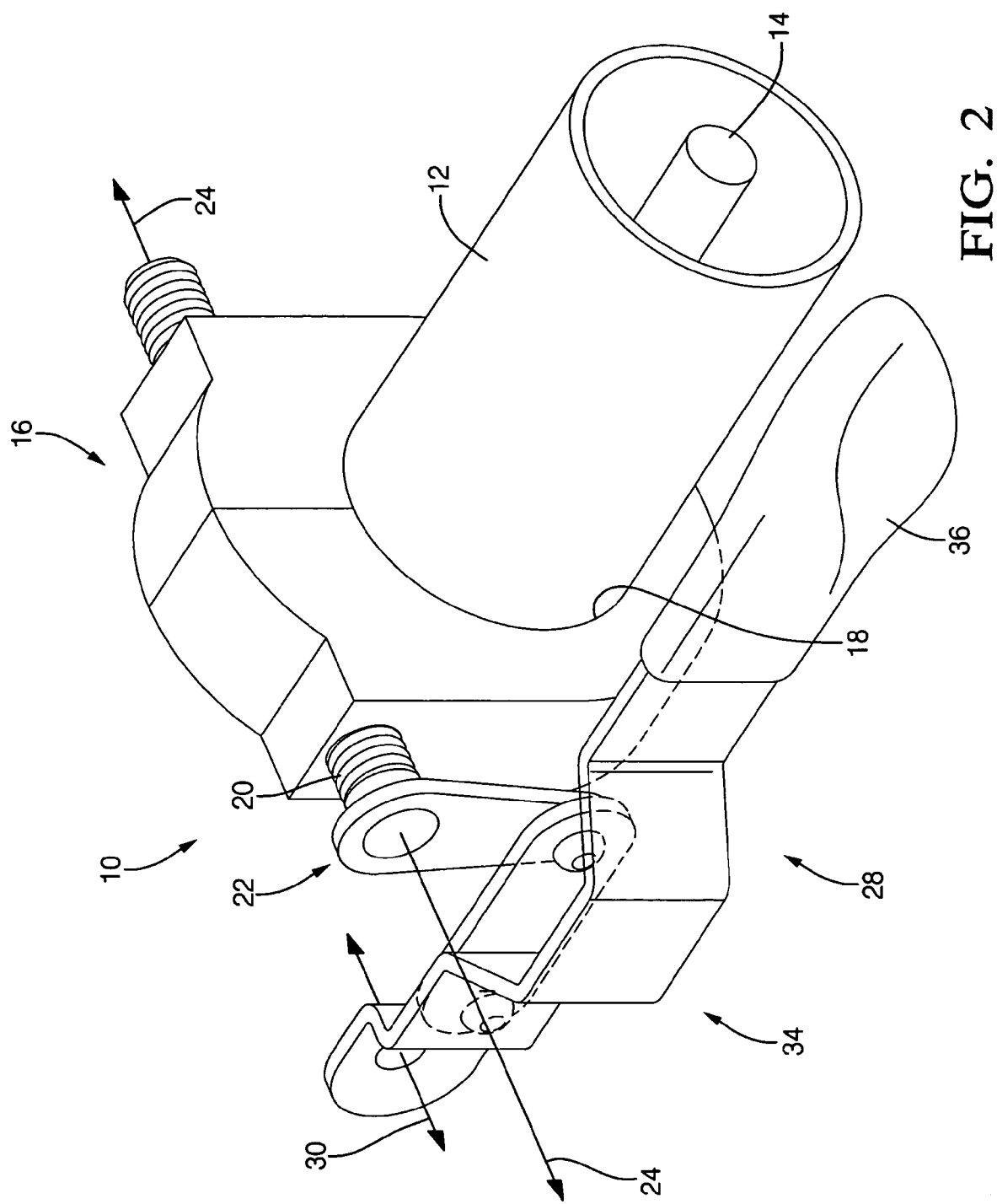
FIG. 2 is a perspective view of the first exemplary of the invention in a locked configuration.

Referring now to FIGS. 1 and 2, in a first exemplary embodiment of the invention, a steering column assembly 10 includes a steering column jacket 12 operable to support a steering shaft 14 in a vehicle. A steering wheel (not shown) can be engaged at one end of the steering shaft 14. A collar 16 presents a surface 18 for guiding movement of the steering column jacket 12. The collar 16 can guide sliding movement of the steering column jacket 12, corresponding to telescoping movement, or can guide raking movement of the steering column jacket 12, such as shown in FIG. 6 corresponding to the second exemplary embodiment of the invention. In other embodiments of the invention, the collar 16 can be integrally formed with a first steering column jacket and guide movement of a second steering column jacket.

A locking member 20 is operable to move in a first direction from an unlocked position to a locked position to increasingly urge the steering column jacket 12 and the surface 18 together to lock relative movement between the steering column jacket 12 and the collar 16. In the first exemplary embodiment of the invention, the locking member 20 is thread defined on the outer surface of a shaft 22. The thread of the locking member 20 is engaged with collar 16 at two positions of the collar 16. The collar 16 is c-shaped and includes first and second side walls 38, 40 integrally formed with respect to one another. The first and second side walls 38, 40 define the surface 18. The collar 16 extends between first and second ends 42, 44. The locking member 20 urges the first and second side walls 38, 40 together at the first and second ends 42, 44.

The shaft 22 is operable to rotate in a first angular direction about a first axis 24 to move the locking member 20 in the first direction. FIG. 1 shows the locking member 20 in the unlocked position. The collar 16 defines a gap between the first and second ends 42, 44 and the steering column jacket 12 can move relative to the collar 16. FIG. 2 shows the locking member 20 in the locked position after the shaft 22 has been rotated. Rotation of the shaft 22 moves each individual thread of the locking member 20. After the shaft 22 has been rotated to move the locking member 20 to the locked position, the gap between first and second ends 42, 44 closes in the first exemplary embodiment of the invention, as best shown in FIG. 2.

However, in alternative embodiments of the invention, a gap may still exist between the ends of the collar after the locking member 20 has been moved to the locked position.

A crank 26 extends radially outwardly from the shaft 22. The crank 26 is fixedly engaged with the shaft 22 such that the crank 26 and shaft 22 rotate together. A lever 28 is operable to rotate in a second angular direction about a second axis 30 spaced from the first axis 24. The lever 28 can be engaged by an operator of the vehicle to move the locking member 20. The axis 30 can be defined by a shaft. A link 32 pivotally interconnects the crank 26 and the lever 28 to transmit rotation of the lever 28 to rotate the crank 26 thereby rotating the shaft 22. The lever 28 includes a handle portion 36 and the link 32 is pivotally connected to the lever 28 between the handle portion 36 and the second axis 30. The link 32 is engaged with the lever 28 for pivoting relative movement about a third axis 46. The link 32 is engaged with the crank 26 for pivoting relative movement about a fourth axis 48.

The distance between the several axis' 24, 30, 46, 48 can be selected to result in the link 32 defining a force multiplier between the lever 28 and the crank 26. Also, the link 32 and the crank 26 and the lever 28 can cooperate to define an over-center mechanism 34. FIGS. 3, 4 and 5 are schematic views wherein the axis 24, 30, 46, 48 extend normal to the plane of view. FIG. 3 corresponds to FIG. 1 in that the locking member 20 (shown in FIG. 1) is disposed in the unlocked position. FIG. 5 corresponds to FIG. 2 in that the locking member 20 (shown in FIG. 2) is disposed in the locked position. FIGS. 3 and 5 generally show the beginning and ending of movement, respectively, of the locking member 20 from the unlocked position to the locked position; FIG. 4 shows, generally, the positions of the axis 24, 30, 46, 48 when the locking member 20 is between the unlocked and locked positions. The lever 28 can be moved in the direction 50 to urge the axis 46 to an on-center position shown in FIG. 4. The axis 46 is on-center in that the axis 30, 46, and 48 are coplanar when the axis 46 is on-center. The force required to move the axis 46 from the position shown in FIG. 3 to the on-center position shown in Figure increases during movement since, during this movement by the axis 46, the crank 26 and shaft 22 are rotating in the direction 52 about the axis 24 and the locking member 20 is moving in the first direction toward the locked position.

After the axis 46 has been moved to the on-center position shown in FIG. 4, the lever 28 can continue to move in the direction 50. The axis 46 moves to an over-center position shown in FIG. 5. During movement of the axis 46 from the on-center position to the over-center position, the crank 26 and shaft 22 rotate about the axis 24 in the direction 54, opposite the direction 52. As a result, the locking member 20 is moving in a second direction opposite the first direction when the axis 46 moves from on-center to over-center. Further, the force required on the lever 28 decreases during movement corresponding to movement of the axis 46 moves from on-center to over-center. Movement beyond the over-center position is substantially prevented because the lengths of the link 30 and the crank 26, as well as the proximity of the axis 46 and 24. The cooperation described above allows the operator of the vehicle to feel when the locking member 20 is in the locked position in that the force required to move the lever 28 increases over a portion of travel, maximizes, and then slightly lowers.

Referring now to FIG. 6, in a second exemplary embodiment of the invention, a steering column assembly 10a includes a steering column jacket 12a operable to support a steering shaft 14a. The steering column jacket 12a is moveable in raking movement along a path 58. A collar 16a presents a surface 18a for guiding movement of the steering column jacket 12a. The collar includes first and second side walls 38a, 40a that are individual engaged with a vehicle 56. In alternative embodiments of the invention, the side walls 38a, 40a could be integrally formed with respect to one another. A locking member 20a defined as threads on a shaft 22 is operable to move in a first direction from an unlocked position to a locked position to increasingly urge the steering column jacket 12a and the surface 18a together to lock relative movement between the steering column jacket 12a and the collar 16a. The shaft 22a is operable to rotate in a first angular direction about a first axis 24a to move the locking member 20a in the first direction. The locking member 20a urges the first and second side walls 38a, 40a together during movement to the locked position. The first and second side walls 38a, 40a contact the steering column jacket 12a when the locking member 20 is in the locked position. The second exemplary embodiment of the invention can include a crank, link and lever similar to the other embodiments of the invention, such as the first exemplary embodiment.

Referring now to FIG. 7, in a third exemplary embodiment of the invention, a steering column assembly 10b includes a steering column jacket 12b operable to support a steering shaft 14b. A collar 16b presents a surface 18b for guiding movement of the steering column jacket 12b. The collar 16b is c-shaped and extends between first and second ends 42b, 44b. In the third exemplary embodiment of the invention, the surface 18b guides telescoping movement of the steering column jacket 12b. A locking member 20b is operable to move in a first direction from an unlocked position to a locked position to increasingly urge the steering column jacket 12b and the surface 18b together to lock relative movement between the steering column jacket 12b and the collar 16b. The locking member 20b is spaced from the first and second ends 42b, 44b. In the third exemplary embodiment of the invention, the locking member 20b is a cam or protrusion fixedly disposed on a shaft 22. The shaft 22b is operable to rotate in a first angular direction about a first axis 24b to move the locking member 20b in the first direction. The locking member 20b engages the steering column jacket 12b in the locked position and is spaced from the steering column jacket 12b in the unlocked position. The unlocked position of the locking member 20b is shown in phantom. The third exemplary embodiment of the invention can include a crank, link and lever similar to the other embodiments of the invention, such as the first exemplary embodiment.

Referring now to FIGS. 8 and 9, in a fourth exemplary embodiment of the invention, a steering column assembly 10c includes a steering column jacket 12c operable to support a steering shaft 14c. A collar 16c presents a surface 18c for guiding movement of the steering column jacket 12c. A locking member 20c is operable to move in a first direction from an unlocked position to a locked position to increasingly urge the steering column jacket 12c and the surface 18c together to lock relative movement between the steering column jacket 12c and the collar 16c. A shaft 22c is operable to rotate in a first angular direction about a first axis 24c to move the locking member 20c in the first direction. A crank 26c extends radially outwardly from the shaft 22c. A lever 28c is operable to rotate in a second angular direction about a second axis 30c spaced from the first axis 24c. A link 32c pivotally interconnects the crank 26c and the lever 28c to transmit rotation of the lever 28c to rotate the crank 26c thereby rotating the shaft 22c. The lever 28c includes a handle portion 36c and the second axis 30c is disposed between the handle portion 36c and the link 32c. The link 32c and the crank 26c and the lever 28c cooperate to define an over-center mechanism 34c. The collar 16c includes first and second side walls 38c, 40c integrally formed with respect to one another and is c-shaped, extending between first and second ends 42c, 44c. The locking member 20c urges the first and second ends 42c, 44c together during movement to the locked position.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising:
   a steering column jacket operable to support a steering shaft;
   a collar presenting a surface for guiding movement of said steering column jacket;
   a locking member operable to move in a first direction from an unlocked position to a locked position to increasingly urge said steering column jacket and said surface of said collar together to lock relative movement between said steering column jacket and said collar;
   a shaft operable to rotate in a first angular direction about a first axis to move said locking member in said first direction;
   a crank extending radially outwardly from said shaft;
   a lever operable to rotate in a second angular direction about a second axis spaced from said first axis; and
   a link pivotally interconnecting said crank and said lever to transmit rotation of said lever to rotate said crank thereby rotating said shaft;
   wherein said link, said crank and said lever cooperate to define an over-center mechanism.

2. The steering column assembly of claim 1 wherein said lever includes a handle portion and said link is further defined as being pivotally connected to said lever between said handle portion and said second axis.

3. The steering column assembly of claim 1 wherein said lever includes a handle portion and said second axis being disposed between said handle portion and said link.

4. The steering column assembly of claim 1 wherein said collar includes first and second side walls defining said surface, wherein said locking member urges said first and second side walls together.

5. The steering column assembly of claim 4 wherein said first and second side walls are integrally formed with respect to one another.

6. The steering column assembly of claim 1 wherein said collar is further defined as c-shaped and extending between first and second ends.

7. The steering column assembly of claim 6 wherein said locking member urges said first and second ends together during movement to said locked position.

8. The steering column assembly of claim 6 wherein said locking member is spaced from said first and second ends.

9. The steering column assembly of claim 1 wherein said link rotates about a third axis relative to said crank and wherein rotation of said handle moves said third axis into an on-center alignment co-planar with said first axis and said second axis and then past said on-center alignment into an over-center alignment non-planar with said first axis and said second axis wherein said crank moves in one of a clockwise direction and a counterclockwise direction prior to said third axis reaching said on-center alignment and said crank moves in another of said clockwise direction and said counterclockwise direction when said third axis moves past said on-center alignment into said over-center alignment.

* * * * *